United States Patent
Lin

(10) Patent No.: US 7,058,688 B2
(45) Date of Patent: Jun. 6, 2006

(54) MULTI-STAGE EMAIL INTERCEPTION METHOD

(75) Inventor: Feng-Hui Lin, Hsinchu (TW)

(73) Assignee: Accton Technology Corp., Hsinchu (TW)

( * ) Notice: Subject to any disclaimer, the term of this patent is extended or adjusted under 35 U.S.C. 154(b) by 698 days.

(21) Appl. No.: 10/072,886

(22) Filed: Feb. 12, 2002

(65) Prior Publication Data

US 2003/0154294 A1 Aug. 14, 2003

(51) Int. Cl.
*G06F 15/16* (2006.01)

(52) U.S. Cl. .......................... 709/206; 709/207; 707/3; 707/6

(58) Field of Classification Search ................ 709/206, 709/207; 707/3, 6
See application file for complete search history.

(56) References Cited

U.S. PATENT DOCUMENTS

| | | | | |
|---|---|---|---|---|
| 6,052,709 A * | 4/2000 | Paul | .......................... | 709/202 |
| 6,321,267 B1 * | 11/2001 | Donaldson | .................. | 709/229 |
| 6,330,590 B1 * | 12/2001 | Cotten | ........................ | 709/206 |
| 6,493,007 B1 * | 12/2002 | Pang | .......................... | 715/835 |
| 6,507,866 B1 * | 1/2003 | Barchi | ......................... | 709/207 |
| 6,546,416 B1 * | 4/2003 | Kirsch | ......................... | 709/206 |
| 6,643,686 B1 * | 11/2003 | Hall | ............................ | 709/206 |
| 6,691,156 B1 * | 2/2004 | Drummond et al. | ........ | 709/206 |
| 6,769,016 B1 * | 7/2004 | Rothwell et al. | ........... | 709/206 |

* cited by examiner

*Primary Examiner*—Saleh Najjar
*Assistant Examiner*—Shawki Saif Ismail
(74) *Attorney, Agent, or Firm*—Birch, Stewart, Kolasch & Birch, LLP

(57) ABSTRACT

A multi-stage email interception method. First, an email message is received. Then, the receiving number corresponding to the email message is queried from an array according to the related information of the email message. The email message is rejected if the receiving number is higher than a first setting value and the email message conforms to the email characteristics recorded in a specific email record; the email message is accepted first and then deleted if the receiving number is higher than a second setting value and the email address of the recipient of the email message does not appear in the recipient field of the email message; and the email message is accepted and forwarded to a specific mailbox if the receiving number is lower than the second setting value and more than a third setting value and the email address of the recipient of the email message does not appear in the recipient field of the email message.

14 Claims, 1 Drawing Sheet

MULTI-STAGE EMAIL INTERCEPTION METHOD

BACKGROUND OF THE INVENTION

1. Field of the Invention

The present invention relates to an email interception method, and particularly to an email interception method that records the related information of email messages in a first-in-first-out (FIFO) array and intercepts email messages according to its characteristics in multiple stages.

2. Description of the Related Art

With the rise in communicating messages via network, email has become a daily routine for most people. However, unchecked garbage email and commercial email is a problem. Further, the large volume of unchecked garbage email and commercial email may cause the consumption of network bandwidth and the reduction of system performance for enterprise.

Conventional methods of intercepting garbage email and commercial email involve checking the subject and sender of email, or querying an anti-unwanted email database to achieve the interception. However, the actual subject of email will be always changed, for example, a serial number is added to the subject, or the sender may frequently change free email accounts. Therefore, the conventional methods lose the ability to intercept unacceptable email. In addition, conventional methods further limit the number of recipients at a time or delay the transmission time if the number of recipients is higher than the upper limitation. However, this only intercepts or registers email with a large number of recipients, it cannot intercept garbage email and commercial email accurately.

SUMMARY OF THE INVENTION

It is therefore an object of the present invention to provide an email interception method that records the related information of email in a first-in-first-out array and intercepts email according to its characteristics in multiple stages.

To achieve the above object, the present invention provides a multi-stage email interception method. First, an email message is received. Then, the receiving number corresponding to the email message is queried from an array according to the related information of the email message.

Thereafter, the email message is rejected if the receiving number is higher than a first setting value and the email message conforms to email characteristics recorded in a specific email record; the email message is accepted first and then deleted if the receiving number is higher than a second setting value and the email address of the recipient of the email message does not appear in the recipient field of the email message; and the email message is accepted and forwarded to a specific mailbox if the receiving number is lower than the second setting value and more than a third setting value and the email address of the recipient of the email message does not appear in the recipient field of the email message. The first setting value is larger than the second setting value, and the second setting value is larger than the third setting value.

According to the embodiment, the email characteristics corresponding to the email message is recorded into the specific email record if the receiving number is higher than a second setting value and the email address of the recipient of the email message does not appear in the recipient field of the email message.

Further, the related information of the email message is recorded into the array. The related information of the email message includes the subject and text information of the email message. The email characteristics includes the network address of the host sending the email message, the name and email address of the sender included in the sender information, and the subject.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
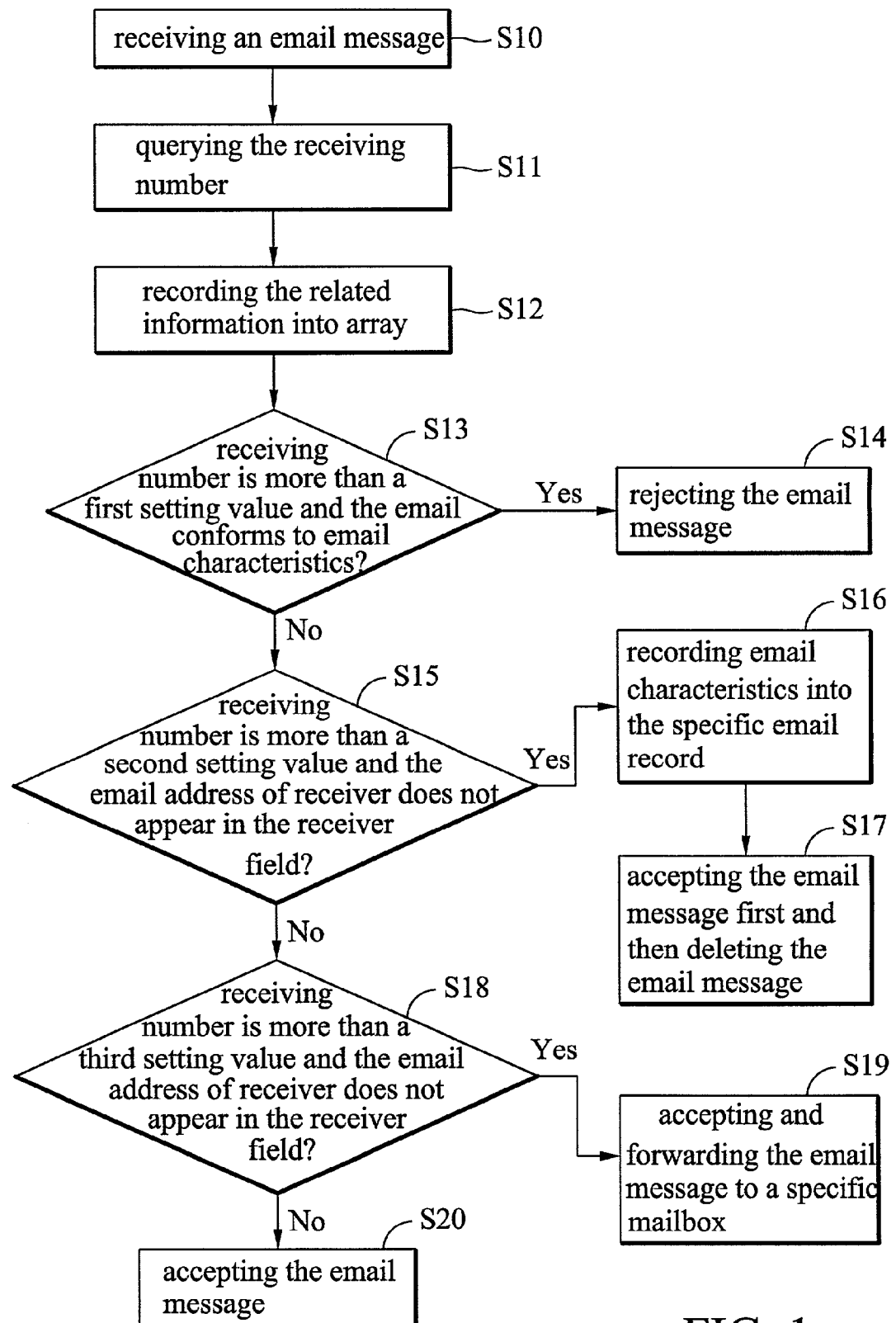
FIG. 1 is a flow chart illustrating the operation of a multi-stage email interception method according to the embodiment of the present invention.

FIG. 1 shows a flow chart illustrating the operation of a multi-stage email interception method according to the embodiment of the present invention. Referring to FIG. 1, the embodiment of the present invention is described as follows.

The present invention is suitable for implementation in a mail gateway, so as to intercept unacceptable email.

First, in step S10, an email message is received. Then, in step 11, the receiving number corresponding to the email message is queried from an array according to the related information of the email message. The receiving number is the times of the email message received by the mail gateway. The related information of the email message may include the subject, number of recipients, sender (FROM), recipients (TO), copy recipients (CC), hidden copy recipients (BCC) and text information, such as the first line of the text of the email message. The array can be a first-in-first-out array to store the related information of email message received for a period. Since this array is a first-in-first-out array, the oldest related information will be replaced by the related information of new received email message if the array is full. Then, in step S12, the related information of the received email message is recorded into the array.

Thereafter, in step S13, the receiving number is assessed as being higher than a first setting value and the email message is determined whether it conforms to the email characteristics recorded in a specific email record. The specific email record is used to record the email characteristics corresponding to unacceptable email, the email characteristics may include the network address of the host sending the email message, the name and email address of the sender included in the sender information, and the subject.

Then, in step S14, the email message is rejected directly if the receiving number is higher than the first setting value and the email message conforms to the email characteristics recorded in the specific email record (the YES in step S13).

If the receiving number is lower than the first setting value and/or the email does not conform to the email characteristics recorded in the specific email record (the NO in step S13), in step S15, the receiving number is assessed as being higher than a second setting value and the email address of the recipient of the email message is assessed as appearing in the various recipient fields, such as recipient (TO), copy recipients (CC),and hidden copy recipients (BCC) of the email message.

If the receiving number is higher than the second setting value and the email address of the recipient of the email message does not appear in the recipient field of the email message (the YES in step S15), then in step S16, the email characteristics corresponding to the email message are recorded into the specific email record, and then in step S17, the email message is accepted first and then deleted. It should be noted that the process in step S17 is used to avoid notice by the sender of the deletion of email directly.

If the receiving number is lower than the second setting value and/or the email address of the recipient of the email message appears in the recipient field of the email message (the NO in step S15), in step S18, the receiving number is determined whether it is lower than the second setting value and more than a third setting value and the email address of the recipient of the email message is assessed as appearing in the recipient field.

Then, in step S19, the email message is accepted and forwarded to a specific mailbox if the receiving number is lower than the second setting value and more than the third setting value and the email address of the recipient of the email message does not appear in the recipient field of the email message (the YES in step S18). The specific mailbox is used to store the email message classified as unacceptable. In step S20, the email message is accepted and forwarded to the corresponding recipients if the receiving number is lower than the third setting value and/or the email address of the recipient of the email message appears in the recipient field of the email message (the No in step S18).

I should be noted that the first setting value is larger than the second setting value, and the second setting value is larger than the third setting value. These setting values can be set according to various applications, such as personal email management or enterprise email management.

As a result the multi-stage email interception method according to the present invention can record the related information of email messages in a first-in-first-out array and intercept email messages according to characteristics in multiple stages.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A multi-stage email interception method, comprising the steps of:
   receiving an email message;
   querying a receiving number corresponding to the email message from an array according to related information of the email message;
   rejecting the email message if the receiving number is higher than a first setting value and the email conforms to email characteristics recorded in a specific email record;
   recording the email characteristics corresponding to the email message into the specific email record if the receiving number is higher than a second setting value and an email address of the recipient of the email message does not appear in at least one recipient field of the email message;
   accepting the email message first and then deleting the email message if the receiving number is higher than the second setting value and the email address of the recipient of the email message does not appear in the recipient field of the email message; and
   accepting and forwarding the email message to a specific mailbox if the receiving number is higher than a third setting value and the email address of the recipient of the email message does not appear in the recipient field of the email message.

2. The method as claimed in claim 1 further recording the related information of the email message into the array.

3. The method as claimed in claim 1 wherein the array is a first-in-first-out array.

4. The method as claimed in claim 1 wherein the related information comprises the subject of the email message.

5. The method as claimed in claim 1 wherein the related information comprises the text information of the email message.

6. The method as claimed in claim 1 wherein the email characteristics comprise the network address of the host sending the email message.

7. The method as claimed in claim 1 wherein the email characteristics comprise the sender information.

8. The method as claimed in claim 7 wherein the sender information comprise the name of the sender.

9. The method as claimed in claim 7 wherein the sender information comprise the email address of the sender.

10. The method as claimed in claim 1 wherein the email characteristics comprise the subject.

11. The method as claimed in claim 1 wherein the recipient field comprises the field of direct recipients.

12. The method as claimed in claim 1 wherein the recipient field comprises the field of copy recipients.

13. The method as claimed in claim 1 wherein the recipient field comprises the field of hidden copy recipients.

14. The method as claimed in claim 1 wherein the first setting value is larger than the second setting value, and the second setting value is larger than the third setting value.

* * * * *